United States Patent [19]
Turunen

[11] Patent Number: 5,637,286
[45] Date of Patent: Jun. 10, 1997

[54] PROCESS FOR PRODUCING HYDROGEN PEROXIDE

[75] Inventor: Ilkka Turunen, Oulu, Finland

[73] Assignee: Kemira Chemical OY, Helsinki, Finland

[21] Appl. No.: 404,170

[22] Filed: Mar. 14, 1995

[30] Foreign Application Priority Data

Mar. 15, 1994 [FI] Finland .................................. 941217

[51] Int. Cl.$^6$ ............................................. C01B 15/023
[52] U.S. Cl. ............................................. 423/588; 422/211
[58] Field of Search ............................................. 423/588, 589

[56] References Cited

U.S. PATENT DOCUMENTS

| | | |
|---|---|---|
| 1,227,047 | 5/1917 | Gray . |
| 2,837,411 | 6/1958 | Jenney . |
| 2,966,398 | 12/1960 | Jenney ............................ 423/588 |
| 3,009,782 | 11/1961 | Porter . |
| 3,423,176 | 1/1969 | Kabisch et al. . |
| 3,565,581 | 2/1971 | Lee . |
| 3,755,552 | 8/1973 | Lee et al. . |
| 3,761,580 | 9/1973 | Schreyer et al. ............................ 423/588 |
| 4,428,922 | 1/1984 | Hopkins . |
| 4,428,923 | 1/1984 | Kunkel et al. . |
| 4,552,748 | 11/1985 | Berglin et al. . |
| 5,063,043 | 11/1991 | Bengtsson . |

FOREIGN PATENT DOCUMENTS

| | | |
|---|---|---|
| 0 111 133 | 11/1982 | European Pat. Off. . |
| 0 102 943 A3 | 9/1983 | European Pat. Off. . |
| 0 384 905 A1 | 2/1990 | European Pat. Off. . |
| 89787 | 8/1990 | Finland . |
| 2 642 412 | 1/1990 | France . |
| 8702882 | 12/1987 | Netherlands . |
| 718307 | 11/1954 | United Kingdom . |

OTHER PUBLICATIONS

WO93/02960 (Turunen et al) published Feb. 18, 1993.

*Primary Examiner*—Wayne Langel
*Attorney, Agent, or Firm*—Thorpe, North & Western

[57] ABSTRACT

The invention relates to a method for producing hydrogen peroxide by the anthraquinone process, by feeding into the top part of a fixed bed reactor (4) hydrogen (3) and a working solution (1), i.e. an anthraquinone derivative in an organic solvent, and by making these infed substances flow downwardly in the reactor, in order to catalytically hydrogenate the anthraquinone derivative owing to the influence of the catalyst bed (6) and by removing the hydrogenated working solution (9) from the reactor. According to the invention, there is used a fixed bed reactor provided with a stationary catalyst bed that has an open structure. The said working solution is fed into the top part of the reactor at a velocity so high that a separate gas space is not created at the top of the reactor, and that in the top part there is created a dense dispersion of the working solution and gas, and that in the reactor itself there is maintained a relatively high flow velocity, in order to make the said dense dispersion proceed deep down into the catalyst bed. The invention also relates to a fixed bed reactor used for realizing the process.

20 Claims, 3 Drawing Sheets

PROCESS FOR PRODUCING HYDROGEN PEROXIDE

BACKGROUND OF THE INVENTION

1. The Field of the Invention

The present invention relates to producing hydrogen peroxide by means of the so-called anthraquinone process. More specifically, the invention relates to an essential unit process of the said method, i.e. hydrogenation. The invention also relates to a hydrogenation reactor.

2. The Background Art

In the prior art it is known that hydrogen peroxide is produced by the so-called anthraquinone process. This process is based on alternate hydrogenation and oxidation of anthraquinone derivatives, generally alkyl anthraquinones. Alkyl anthraquinones are present in the process as dissolved in a solvent formed of several organic substances. This solution, which is called the working solution, circulates continuously through the most important steps of the process. In the hydrogenation step, the alkyl anthraquinones are catalytically hydrogenated into alkyl anthrahydroquinones:

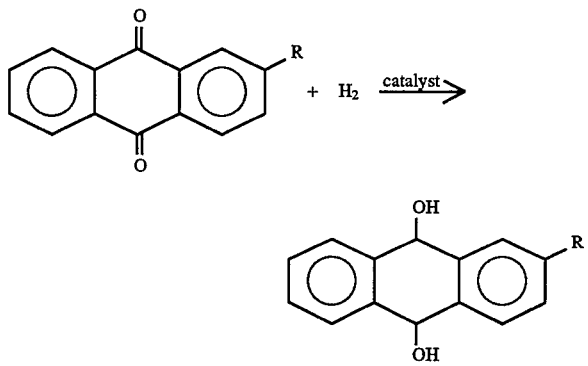

In the next step, oxidation, alkyl anthrahydroquinones react with oxygen, whereupon they are returned to their original state, i.e. to alkyl anthraquinones. At the same time, there is created hydrogen peroxide. Oxidation is followed by extraction, where the hydrogen peroxide dissolved in the working solution is extracted therefrom with water. An aqueous solution of hydrogen peroxide is thus obtained. The extracted working solution is dried of excess water and recycled to the beginning of the process, i.e. to hydrogenation. The aqueous solution of hydrogen peroxide is purified and concentrated. More detailed information of the anthraquinone process is given for instance in Ullmann's Encyclopedia of Industrial Chemistry, 5th edition, Vol. A13, pages 447–456.

The hydrogenation step in the hydrogen peroxide process has been realized with many different types of reactors. Part of these are so-called suspension reactors, where catalyst particles move in the working solution, part are fixed bed reactors, where the catalyst remains in place in stationary structures.

When comparing various hydrogenation reactors, one of the most important criteria is the product yield per reactor volume or per catalyst mass unit. Another important feature is good selectivity, in other words a desired ratio between the conversions of the main reaction and the sidereactions. The quantity of wasted hydrogen must also be small, which means that a good yield must be achieved with a minimal hydrogen excess. Other essential differences are found in the auxiliary equipment required for hydrogenation, such as the catalyst filtration equipment, as well as in the hydrogenation-maintaining operations, such as catalyst regeneration. Consequently, there are several factors relevant for the comparison, and certainly none of the used reactors is best in all respects. A relatively comprehensive view in the comparison is naturally achieved by studying the overall costs of hydrogenation.

The yield and selectivity of the reactor are mainly dependent on the hydrogenation pressure and temperature, the concentrations of the reacting substances, the activity of the catalyst, the mixing conditions and the retention time of the reacting mixture in the reactor. The properties of the catalyst have a decisive effect on the rate of the reaction itself. Another factor affecting the rate of hydrogenation, apart from the reaction rate itself, is mass transfer, particularly the transfer of hydrogen from gas to liquid and further to the surface of the catalyst. Thus it is important to provide advantageous conditions for mass transfer.

As for yield and selectivity, there exists an optimal pressure and temperature for hydrogenation. In order to carry out the hydrogenation process as near to these conditions as possible, it is advantageous that the reactor pressure and temperature fluctuate within a range as narrow as possible.

The employed suspension catalyst has been porous palladium (so-called palladium black) or raney nickel or, in some cases, palladium on a carrier (active carbon, aluminium oxide). When using a suspension catalyst, the hydrogenation reactor can be for instance of the stirred tank type. There is also known a suspension reactor operated on the air lift principle (GB patent 718,307). There are further known tubular reactors, where mixing is achieved either by turbulence caused by a high flow velocity (U.S. Pat. No. 4,428,923), by adjustments in the tube diameter (U.S. Pat. No. 3,423,176) or by static mixers (NL patent application 8702882).

Suspension reactors do, however, have several drawbacks in comparison with fixed bed reactors. Firstly, when using a suspension catalyst, there is needed effective filtration after hydrogenation, because none of the catalyst must be allowed to enter the next step of the process, i.e. oxidation. In this case filtration is fairly expensive and technically problematic, requiring complicated circulation arrangements. Filtration is made particularly difficult by the fact that the catalyst particles are extremely small.

When a suspension reactor is used, a large part, even the major part of the expensive catalyst may be in some other area than the reactor itself, in other words in the filtration equipment, in the circulation tank or in the connected pipework. Part of the catalyst may remain stuck on the stationary surfaces of these fixtures for remarkable lengths of time. Thus only part of the catalyst is found in the reaction space, where it is useful.

A third drawback of the suspension reactor is the greater susceptibility of the catalyst to mechanical wearing. This may be one of the reasons for the known fact that the catalyst in a fixed bed reactor generally maintains its activity longer than the suspension catalyst.

These three drawbacks do not appear, if the catalyst is attached to stationary support structures, in which case the reactor is a fixed bed reactor. A traditional fixed bed reactor contains layers formed of particles, generally with a diameter of 0.2–10 mm. Sometimes the particles are round, sometimes grains or pellets of indeterminate shape. The carrier in these particles is some porous substance with a large specific surface, such as aluminium oxide, activated carbon or silica gel. In the carrier, there is absorbed some precious metal to serve as the catalyst, in this case usually palladium. In hydrogenation, the working solution and the hydrogen flow concurrently or countercurrently through the catalyst layer. This type of fixed bed reactor is always referred to below when speaking of a "traditional fixed bed reactor".

The traditional fixed bed reactor described above suffers from several drawbacks weakening the efficiency of the hydrogenation. First of all, the transfer of hydrogen from gas to liquid, and in the liquid further to the surface of the catalyst, is not very fast in an apparatus of this type. Thus a patent publication describing the said reactor type (U.S. Pat. No. 1,227,047, page 2, column 2, lines 74–81) states that the dissolution of hydrogen takes place at a lower rate than the reaction itself in the catalyst. This is a weakness of the traditional fixed bed type reactors as compared with suspension reactors, for example. In order to minimize the amount of the expensive catalyst, the hydrogen should dissolve so quickly that it would not noticeably restrict the overall rate of the hydrogenation process. This is the case with the most advanced suspension reactors, for instance with the reactor type described in the NL patent application 8702882.

Another drawback of the traditional fixed bed reactor type is that the flow is easily channelled in the catalyst layer. This means that a high flow velocity prevails in some places, whereas in other places the flow may be practically nonexistent. Channelling may also lead to a situation where the gas finds its own routes through the catalyst layer, and consequently does not flow evenly everywhere. Channelling naturally reduces the overall rate of the hydrogenation process.

Although the activity of the catalyst generally lasts better in the fixed bed reactor than in the suspension reactor, the activity finally wears out irrespective of the reactor type. Then the catalyst must be removed and regenerated. In most fixed bed reactors this is an arduous operation, which can be considered as a drawback in comparison with suspension reactors. In traditional fixed bed reactors, the removal of the catalyst mass and reinstallation of a new catalyst easily takes a few days. Usually the catalyst bound to a carrier must be sent back to the producer, and a replacement is bought from the same. Consequently, in the case of a fixed bed reactor, the regeneration of the catalyst often means exchanging it. When using a suspension reactor, the replacement of the catalyst can be carried out gradually, without stopping the reactor. Moreover, if there is used a catalyst without a carrier (for instance palladium black), the regeneration thereof can be carried out fairly easily without resorting to the catalyst producer enterprises.

In order to help dissolve the hydrogen, the U.S. Pat. No. 3,565,581 suggests a fixed bed reactor with alternate catalyst layers and inert carrier layers. This arrangement, however, increases the reactor volume, and hence also the quantity of the expensive working solution circulating in the process.

Another suggestion to help dissolve hydrogen is disclosed in the U.S. Pat. No. 2,837,411, where the working solution is saturated with hydrogen in a separate tank prior to the reactor. The use of this technique also leads to an increase in the amount of the working solution. Moreover the usefulness of the predissolution is fairly limited, because a multiple quantity of hydrogen is consumed in the reactor in comparison with the amount that is made to dissolve to the working solution at a time. For the same reason, a very limited advantage is gained from the invention introduced in the U.S. Pat. No. 4,428,922, where hydrogen is premixed to the working solution prior to the reactor by means of a static mixer.

As a conclusion of the comparison of traditional fixed bed reactors with suspension reactors, it is maintained that the former have at least the following advantages:

Firstly, in a fixed bed reactor the required filtration of the catalyst is generally a lesser and cheaper operation. In suspension reactors, filtration can be extremely difficult, complicated and expensive.

Secondly, in a fixed bed reactor all of the catalyst is inside the reactor, where hydrogen also is found, and the catalyst is in use. When using a suspension reactor, catalyst is found mixed in the liquid in other parts, too, for instance in the circulation tank, filtration equipment and connected pipework. In the latter case there is thus needed an excess of the expensive catalyst, in addition to the quantity which is in effective use.

Thirdly, in a fixed bed reactor the catalyst generally retains its activity longer than in a suspension reactor.

On the other hand, at least two drawbacks can be associated with the traditional fixed bed reactor. First of all, the hydrogen transfer from gas to liquid and further to the catalyst is slower than in the best suspension reactors, which are described in the NL patent application 8702882 and in the U.S. Pat. No. 4,428,923. Secondly, the regeneration of the catalyst is more cumbersome than for instance when using palladium black in a suspension.

As an arrangement different from the traditional fixed bed reactor there is suggested a reactor with a honeycomb structure (U.S. Pat. No. 2,837,411, FI patent 89,787 and FI patent 88,701). Here the catalyst bed is constructed by providing the reactor with one or several honeycomb-type catalyst elements, so that these elements form parallel channels, wherethrough the working solution is circulated several times, advantageously concurrently with hydrogen. The catalyst is attached to the walls of the channels. A better hydrogenation result is achieved with an application where the honeycomb structure contains, in addition to the channels parallel to the main flow, channels perpendicular thereto, and where also mixing is provided within the reactor, for instance by means of static mixers (FI patent 88,701).

The advantages of the honeycomb structure are probably based on hydrogen transfer. There hydrogen is made to proceed from gas through the working solution to the catalyst faster than in a traditional fixed bed reactor. Channelling is not a danger either, if the liquid is originally distributed evenly to the various channels of the honeycomb structure.

The yields of honeycomb structured reactors and traditional fixed bed reactors can be compared on the basis of information given in published patents. In a honeycomb structured reactor (European patent application 0,384,905), the reported yield is 133 kg $H_2O_2$ / ($m^3$ h), where the yield is thus calculated per volume unit of the reactor structure. A reported yield for a traditional fixed bed reactor (U.S. Pat. No. 3,009,782, FIG. 1) is about 1 mol $H_2O_2$/h per each liter of the catalyst bed, which amounts to 34 kg/ (h $m^3$) only. Partly this difference can naturally be explained by a different activity of the catalyst itself.

The honeycomb structured reactor also has its drawbacks. Presumably the most essential of these is connected to the regeneration of the catalyst. The honeycomb structured catalyst elements, whether ceramic or metallic in frame, require a complicated production technique. In addition to this, they are expensive. The removal of passivated catalyst from the walls of the channels of the structures is probably not possible without breaking up the whole catalyst honeycomb. In any case, the regeneration of the catalyst is an arduous and very costly operation, when this type of reactor application is used.

Another drawback here is the distribution of the liquid into the honeycomb catalyst reactor. The U.S. Pat. No.

4,552,748 specifies that the channels are advantageously 1–2 mm in diameter. The liquid is attempted to be distributed from the top evenly into these tiny channels. According to the FI patent 89,787, the employed distributor can be a sieve bottom, i.e. a perforated plate. The liquid flows through the perforations in the sieve bottoms as trickles and hits the honeycomb structure located therebelow. In order to make the liquid distribute evenly into the adjacent channels with a diameter of 1–2 mm located in the honeycomb, the perforations in the sieve bottom must be fairly small. As for the size of the perforations, literature (Irandoust, S., Andersson, B., Bengtsson, E., SiverstrBöBm, M., Scaling Up a Monolithic Catalyst Reactor with Two-Phase Flow, Ind. Eng. Chem. Res., 1989, 28, page 1490) suggests a diameter within the range 0.5–1.5 mm. In the hydrogenation step of the hydrogen peroxide process, holes this small are easily clogged and are therefore a danger for the operation of the whole process. Moreover, an even distribution of the liquid is an apparent problem in this reactor, no matter what kind of distributor device is employed.

BRIEF SUMMARY OF THE INVENTION

In the present invention, a new and effective reactor structure is created for the hydrogenation of the hydrogen peroxide process, whereby the achieved yield is at least as good as with a honeycomb structured reactor, but where the regeneration of the catalyst is a remarkably slighter problem, and there are no difficulties in an even supply of the flow into the reactor. In addition, there is discovered a particularly advantageous method of running the reactor. Owing to the structure of the reactor, the hydrogen loss is minimal. The essential novel features of the invention are stated in the appended patent claims.

The most essential elements of the invention are the particular flow conditions as well as the open structure of the catalyst bed.

According to a preferred embodiment of the invention, the catalyst bed is constructed of elements restricted by a net, preferably metal wire net, and the catalyst is located inside the net structure. The catalyst placed inside this net structure is advantageously palladium bound to a carrier, such as activated carbon, aluminium oxide or silica gel. The quantity of palladium is advantageously less than 10% of the total weight of the palladium and the carrier.

The said net structures, of which the catalyst bed is compiled, can in shape resemble static mixers. Static mixers here refer for instance to devices described in Perry's Chemical Engineers' Handbook, 6th edition, pages 19–22 and 19–23.

The said net structures, of which the catalyst bed is compiled, can also be vertical, plate-like structures restricted on both sides by nets, and the catalyst is located in between the nets.

Advantageously the structure of the said nets is such that they can be removed and opened, so that the catalyst therein can be easily replaced.

The said open structure of the catalyst bed here means a catalyst bed where a sufficiently large portion of the transversal area perpendicular to the flow is free, i.e. available for the liquid-gas dispersion. Advantageously at least 20% of the transversal area of the catalyst bed is free.

The advantageous method of running the reactor of the invention means that the pressure or the surface level of the bottom tank or exhaust tank of the reactor is adjusted by means of the hydrogen supply flow.

BRIEF DESCRIPTION OF THE DRAWINGS

The invention is further described with reference to the appended drawings, wherein.

DETAILED DESCRIPTION OF THE PREFERRED EMBODIMENTS

Figure 1:
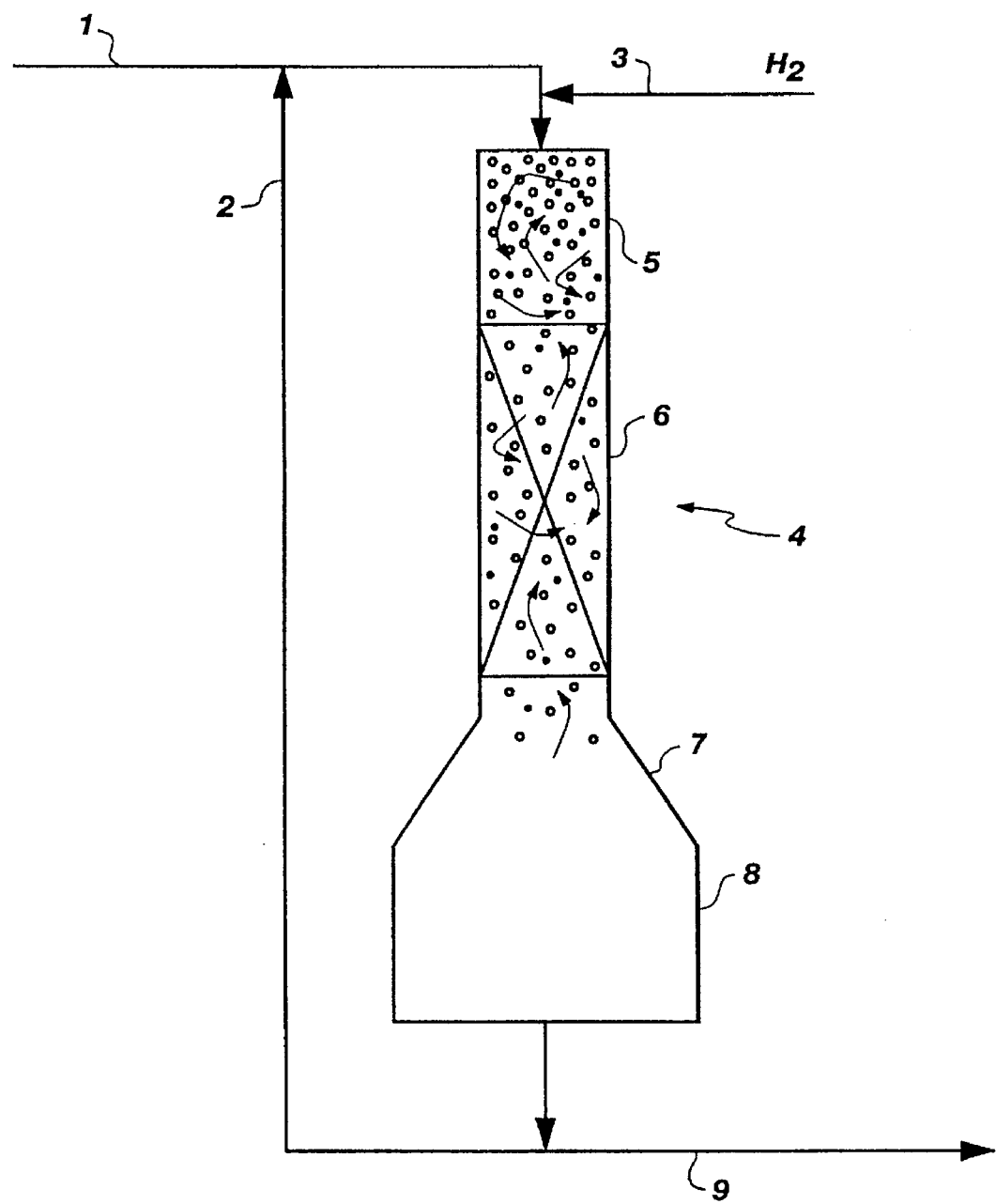
FIG. 1 is a schematical illustration of a hydrogenation process of the invention and of the fixed bed reactor used therein, FIG. 2 ms a schematical illustration of another hydrogenation process of the invention and of the fixed bed reactor used therein.

In FIG. 1, the fixed bed reactor of the invention is denoted with reference number 4. The working solution 1 entering this hydrogenation reactor 4 is fed into the reactor 4 through the top at a high velocity. Advantageously the hydrogen 3 is fed mixed in the working solution, so that it is added to the working solution flow shortly before the conduit to the reactor. However, hydrogen can be fed into the reactor in some other place, too. When the velocity of the working solution at the inlet was maintained sufficiently high (for example 2 m/s or over), it was surprisingly discovered that a gas space is not created at the top end of the reactor, but the reactor is filled up to the top with a liquid-gas dispersion containing numerous small, fairly evenly-sized bubbles that move rapidly to different directions. Another prerequisite for the creation of a uniform and fairly high dispersion layer is that the liquid-gas mixture flows downwardly at a sufficient velocity also in the reactor itself, in order to prevent the creation of a separate gas space at the top. However, the flow velocity in the reactor itself is remarkably lower (for example 5 cm/s–50 cm/s) than at the input (for example 2 m/s–10 m/s). These velocity values were experimentally obtained, but they are not to be understood as restrictive for the invention. All of the said velocities are so-called superficial velocities, which are calculated by dividing the volumetric flowrate by the cross-sectioned area of the reactor or the feed tube.

The above described flow circumstances are an essential feature of the invention, providing advantageous conditions for hydrogen transfer from gas to liquid and further to the solid catalyst. The high feed rate was obtained by means of a feed tube with a sufficiently small diameter. The velocity in the reactor itself can also be obtained by correct design of the cross-sectional area, as well as by the volume flowrate of the recirculation of the working solution 2. If the reactor is big, its top part can be made in the form of a downwardly expanding cone, which helps achieve the desired conditions. The hydrogenated working solution is exhausted through the line 9.

In experiments carried out in glass equipment it was found out that the dispersion of gas into liquid was efficient. The gas bubbles were small, there were a lot of them and they moved actively around. On the basis of mere visual observations it could be concluded that in the top part 5 of the reactor, where there were no catalyst structures, the working solution was saturated or nearly saturated with hydrogen. Surprisingly it was discovered that the dispersion continued in a dense, almost foam-like state far down, into the catalyst bed 6. The prerequisite was that the catalyst bed was rather open in structure. In a compact catalyst bed, of the type that is used in traditional fixed bed reactors, advantageous conditions could not have been maintained. It is impossible to conduct water through a compact catalyst bed at the velocity required here. Moreover, the downwardly passage of the gas bubbles should for a large part have stopped at the dense catalyst bed.

For the above mentioned reasons, a catalyst bed with an open structure is, apart from the flow conditions described above, an essential element of the invention. When the catalyst layer is sufficiently open, the dense, nearly foam-like gas-liquid dispersion that is advantageous for mass transfer extends in the reactor deep into the catalyst layer. Thus it can be assumed that the working solution is saturated or nearly saturated with hydrogen also in the catalyst bed, where the reaction consumes dissolved hydrogen. This results in that the hydrogen transfer from gas to liquid does not restrict the total velocity of the hydrogenation process, or restricts it only slightly. Therefore the hydrogenation rate is largely defined only on the basis of the properties of the catalyst, which makes the reactor type of the invention as efficient as the best reactors in the art.

Another advantage of the invention is that all hydrogen fed is made to react, and there are no hydrogen losses. The downwardly flow velocity in the reactor can be adjusted to be as high as the rising velocity of the gas bubbles. Thus the gas bubbles do not come out of the reactor but stay within until the gas is consumed in the reaction. One should think that it were difficult to maintain just the right liquid velocity required for this. It is true that it is difficult to know what exactly is the rising velocity of the gas bubbles, which on top of it all somewhat differs according to the size of the bubble. However, we made a surprising discovery that in this sense the desired conditions were easily achieved, not only with one liquid flow velocity, but within a fairly large velocity range. In other words, the liquid velocity could be varied within fairly flexible limits, so that there was still created a dense, nearly foam-like dispersion in the catalyst bed, and no gas was discharged through the bottom end of the reactor. In order to secure the result, the bottom end of the reactor of the invention can be extended by providing it with a downwardly expanding conical part 7 and a cylindrical part 8 connected thereto, in which case the slowing down of the liquid velocity ensures that the gas remains inside the reactor. However, on the basis of the experiments that were carried out it can be stated that even without this precaution, it is easy to run the reactor so that no gas is wasted. If the gas contains inert gas which does not react, this naturally comes eventually out at the bottom end of the reactor. Hydrogen is also discharged in case the supplied quantity is larger than the one consumed in the reactor. Owing to this feature of the reactor, it can be run with a practically nonexistent hydrogen loss.

In the above specification it was pointed out that in the reactor according to the invention, the catalyst layer must be sufficiently open in order to maintain a sufficiently rapid downwardly flow, and in order to make the dense gas-liquid dispersion proceed sufficiently deep into the catalyst layer. The open catalyst bed can for example be composed of packing elements coated with the catalyst. In that case the packing elements must be so large that the required open structure is achieved. However, in the said process the quantity of required catalyst is so large that catalyst-coated packing elements may not be the most advantageous solution. Instead of this, it was found out that it is profitable to place the catalyst in stuctures made of metal net, and the catalyst bed was constructed of these structures. Here the catalyst placed inside a metal net mainly means some precious metal, generally palladium, which is bound to a carrier, such as aluminium oxide, activated carbon or silica gel. This catalyst may be present in the form of grains, pellets or crush. The grain size used in the experiments was 0.5–1.5 mm.

Thus the catalyst bed of the reactor according to the invention can advantageously be constructed of catalyst-containing metal net structures. The structures may be varied in shape. It is required that the structures are so open that the dispersion is not prevented from proceeding deep into the catalyst layer, and that the quantity of catalyst contained in the structures is sufficient. The metal net of which the structures are made must have a sufficiently large mesh aperture, so that the hydrogen-saturated working solution can flow to the catalyst through the net. However, the mesh aperture must not be so large that some of the catalyst escapes through the net. Instead of a metal net, there can be used a net made of some other suitable material.

The metal net structures are particularly advantageous if they are easily lifted out of the reactor and opened, and if the catalyst crush contained therein is easily replaced. This makes the changing of the deactivated catalyst quick and easy.

When designing the shape of the metal net structure, it is essential that a sufficiently large share of the liquid flow should proceed to inside the net, and not only pass by the structures. On the other hand, the structures must not obstruct the dispersion from proceeding deep down into the catalyst layer. There are several structures that fulfil these requirements. The specification below describes two advantageous metal net structures of the catalyst layer. The purpose is not, however, to exclude other structures from the scope of the invention.

An advantageous structure of the catalyst bed is composed of metal net elements constructed as static mixers. Inside the net, there is placed catalyst crush, for instance palladium bound in activated carbon, grain size for example 0.5–1.5 mm. Now the catalyst crush may fill for instance 25% of the volume of the catalyst bed, in which case the majority of the cross-sectiond area of the reactor remains free. This type of catalyst bed is suited for instance to the reactor type of FIG. 1.

Figure 2:
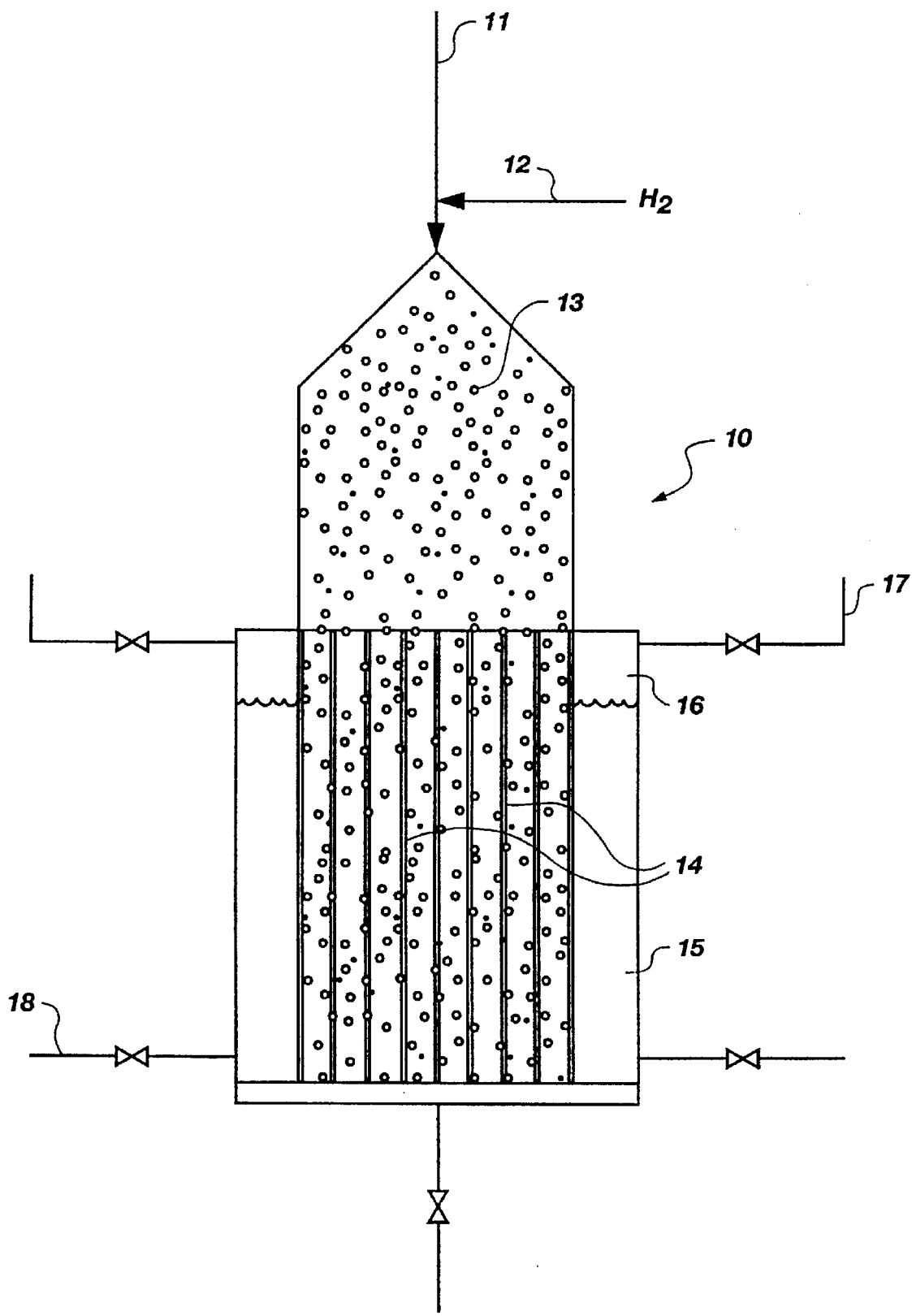

FIG. 2 illustrates another reactor 10, where the catalyst is located inside metal nets. When viewed from the top, the reactor is rectangular in shape. The working solution 11 is supplied through the top at a high velocity. The hydrogen 12 is fed into the working solution. In the top part of the reactor, there is a space 13 where the working solution is saturated with hydrogen. Vertical catalyst plates 14 are installed in the reactor. Each plate consists of two nets with a thin layer of catalyst therebetween. The nets can be opened in order to make it easy to replace the catalyst when it is deteriorated. The catalyst and the nets fill about 30% of the cross-sectional area so that the major part of the cross-sectional area is free for the dispersion to flow. At the top end of the plates, the downwardly flow velocity of the dispersion is high. At the very bottom, the downwardly velocity component is zero. The dense dispersion fills the whole space in between the catalyst plates. The hydrogen-saturated or nearly saturated working solution flows transversally through the catalyst plates, into the liquid space 15 provided on the two sides. There the inert gases contained in the input hydrogen as well as the excess hydrogen are separated from the liquid and proceed through the gas space 16 to the gas removal line 17. The hydrogenated working solution is exhausted through the pipes 18 provided at the sides.

The practical application of both of the above described reactor structures in production requires that the working solution is recirculated several times through the reactor. However, it is not necessary to recirculate the gas, and the quantity of wasted hydrogen is negligible.

It is easily assumed that the catalyst crush, which is densely packed in between nets, should not be in a very efficient use, and that the hydrogen transfer from the liquid to the active catalyst surfaces should be poor. The experiments proved, however, that this is not the case. One explanation for this advantageous discovery is probably the high liquid flow velocity, which intensifies the mass transfer on the surface of the particle. The catalyst layers provided in between the nets should not, however, be too thick, because then the middle part of the catalyst is not in use.

As a conclusion of the advantages of the fixed bed reactor according to the present invention, let us point out the following.

First of all, the reactor has all the advantages of an ordinary fixed bed reactor, as compared with a suspension reactor:

catalyst filtration is slight and cheap the quantity of required catalyst is smaller, because everything is in use, and not for instance in the filtration equipment, recirculation tank or in the connected pipework the catalyst maintains its activity longer.

In addition to this, the mass transfer, particularly the transportation of hydrogen from gas to liquid is rapid. Therefore the total velocity of the hydrogenation process mainly depends on the properties of the catalyst, and is in this reactor type as good as in the best reactors.

In the reactor of the invention, the changing of a deteriorated catalyst is carried out quickly and easily when the catalyst is placed inside metal net structures which can advantageously be opened.

Yet another advantage is the profitable hydrogen economy: the hydrogen loss is minimal.

It is also pointed out that owing to the open structure of the catalyst bed, the pressure loss in the reactive area (in the catalyst bed) is slight, even in a production-scale reactor typically maybe 0.5 bar at the most. Thus the whole reaction can be carried out within a narrow pressure range, near the optimal pressure.

Figure 3:
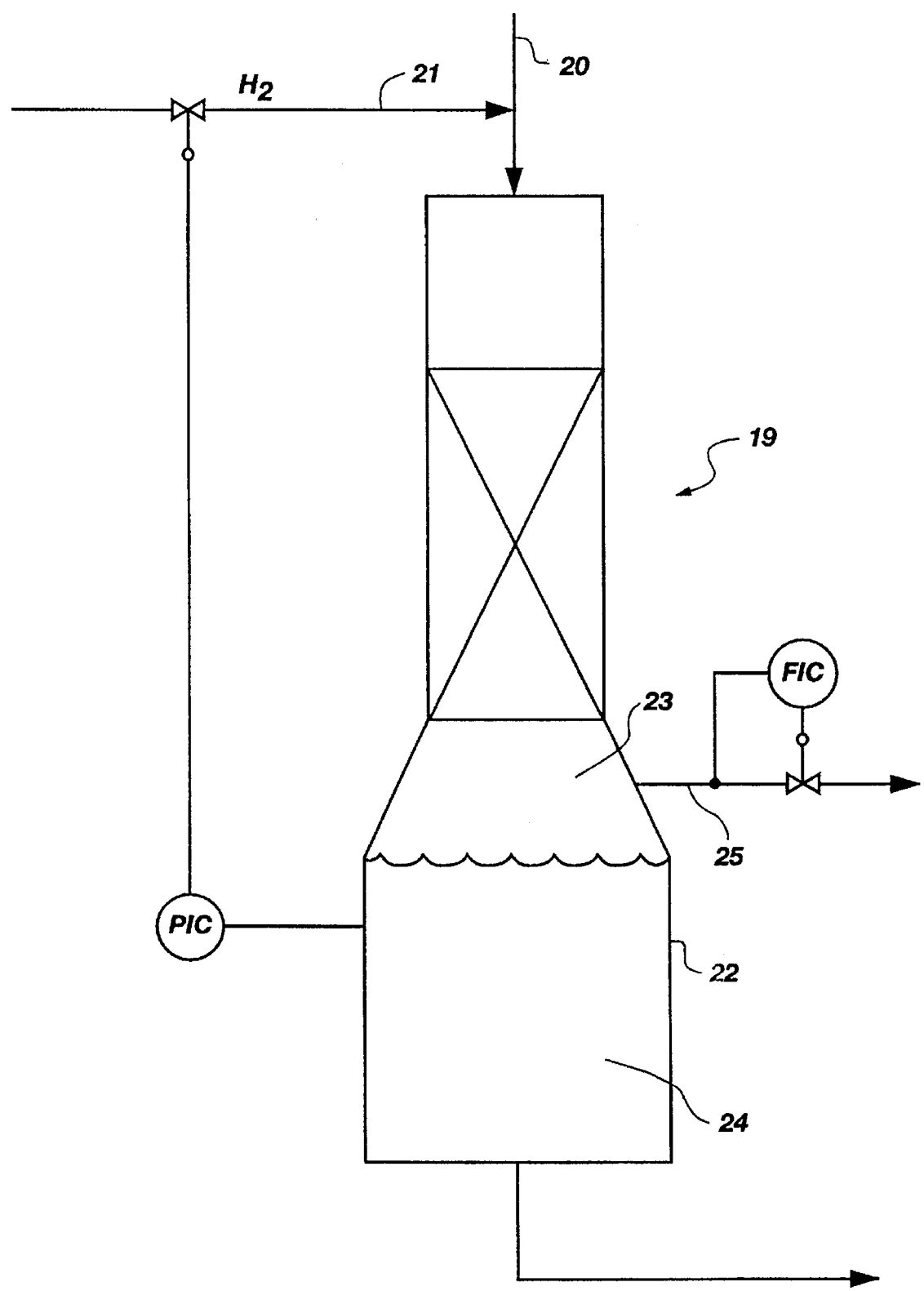
FIG. 3 is a schematical illustration of the method of running the fixed bed reactor of the invention.

The present invention also includes an advantageous method of running the new reactor. This method is explained below with reference to FIG. 3. Into the fixed bed reactor 19, there is supplied the working solution 20. The hydrogen 21 is fed into the working solution. When the quantity of input hydrogen is the maximal quantity which the catalyst can consume, no hydrogen is discharged from the reactor. If a surplus of hydrogen is fed in, gas begins to accumulate in the bottom tank 22, and it must be exhausted. However, the use of excess hydrogen does not increase the yield of the reactor, because it does not essentially expand the gas-liquid interfacial area, which already is large as such. Thus it is profitable to feed into the reactor only as much hydrogen as will react therein. In practice, however, it is necessary to feed in a slight hydrogen excess, in order to prevent possible impurities of the infed hydrogen from concentrating in the reactor. This is realized so that in the reactor, underneath the catalyst layer, there is maintained a gas layer 23, wherebelow there is located a liquid layer 24 in the bottom tank. A standard gas flow is continuously exhausted from the gas layer along the line 25 by employing the flow control PIC. The bottom tank is provided with pressure measurement, which conducts the hydrogen input into the reactor. If more hydrogen is fed into the reactor than the catalyst has time to consume, the pressure in the bottom tank rises and the pressure control PIC cuts down the hydrogen supply. Respectively, when the hydrogen supply is too low, the pressure drops, and the control increases the hydrogen input. Experiments showed that by following this method, the reactor can be run extremely accurately all the time, so that the catalyst is in maximal use. Thus the changes in the activity of the catalyst also are automatically observed in the hydrogen supply. The control of the hydrogen input can also be based on the surface measurement of the bottom tank, but the pressure measurement is a more accurate method.

In practice this method of running the reactor is best utilized so that several reactors are installed in series in the plant. All reactors, except for the last, are arranged to operate in the above described fashion, so that the catalyst is in maximal use. Into the last reactor, there is fed hydrogen by means of a measure meter to such an extent that the desired degree of hydrogenation is achieved. This ensures an efficient use of the catalyst.

It is pointed out that the reactor of the invention is highly economical in several respects. Normally the price of hydrogen is the biggest operational cost in the hydrogen peroxide process. Owing to the structure of the present reactor, the quantity of wasted hydrogen is negligible. The catalyst is likewise expensive. Because the reactor is a fixed bed reactor, all catalyst is in a place where it reacts, i.e. inside the reactor. Moreover, owing to the said advantageous method of running the reactor, the catalyst is in nearly maximal use every moment.

The above specification describes a few preferred embodiments of the invention, and it is naturally clear that the invention can be modified therefrom within the scope of the appended patent claims.

EXAMPLES

The following examples report experiments where a reactor according to FIG. 1 in principle was used. The inner diameter of the reactor was 5 cm, and the volume of the catalyst bed was 0.825 l. The catalyst bed was constructed of elements restricted by a metal net, and the outer dimensions of these elements corresponded to the shape of a static mixer. Inside the net, there was provided catalyst crush composed of palladium bound to activated carbon. The grain size was 0.5–1.0 mm. The proportion of the catalyst crush in the volume of the catalyst bed was 25%. The reactor was run so that the pressure of the bottom tank was adjusted automatically by means of the hydrogen supply. All input hydrogen reacted, none was wasted. The Pd content was 5% of the total weight of the Pd and activated carbon.

EXAMPLE 1

When the liquid velocity at the input was 3.75 m/s and in the reactor 0.18 m/s, and the pressure was 5 bar (abs), the yield was 172 kg $H_2O_2$ / (h $m^3$), where $m^3$ means the volume of the catalyst bed.

EXAMPLE 2

When the liquid velocity at the input was 7 m/s and in the reactor 0.18 m/s, and the pressure was 4 bar (abs), the yield was 163 kg $H_2O_2$ / (h $m^3$).

EXAMPLE 3

When the liquid velocity at the input was 5.2 m/s and in the reactor 0.13 m/s, and the pressure was 4 bar (abs), the yield was 142 kg $H_2O_2$ / (h $m^3$).

What is claimed and desired to be secured by United States Letters Patent is:

1. A method for producing hydrogen peroxide by means of the anthraquinone process comprising the steps of:

feeding into the top part of a fixed bed reactor a plurality of substances, the plurality of substances comprising hydrogen or a hydrogen-containing gas and a working solution, the working solution comprising an anthraquinone derivative in an organic solvent, the reactor having a top part and the top part having a top end;

making the plurality of substances flow downwardly in the reactor in order to hydrogenate the anthraquinone derivative catalytically owing to the influence of a stationary catalyst bed and by removing the hydrogenated working solution from the reactor; and such that the fixed bed reactor is provided with a catalyst bed with an open structure and the working solution is fed to the top part of the reactor at a velocity so great that a separate gas space is not created in the top end of the reactor and in the top end of the reactor there is created a dense dispersion of the working solution and gas, containing numerous gas bubbles in active motion and a flow velocity is maintained in the reactor itself so that said dense dispersion extends deep down into the catalyst bed owing to the flow velocity and to the open structure of the catalyst bed.

2. A method according to claim 1 wherein the input velocity of the working solution into the reactor is in the range from about 2 to about 10 m/s and the downwardly flow velocity of the working solution in the reactor is in the range from about 5 to about 50 cm/s, velocity here meaning superficial velocity.

3. A method according to claim 1 wherein in the catalyst bed is restricted by the net structure and wherein the net structure comprises palladium bound to a carrier, the quantity of the said catalyst being less than about 10% of the total weight of the palladium and the carrier.

4. A method according to claim 1 wherein the input flow of hydrogen or hydrogen-containing gas is adjusted by means of the pressure or level height of the bottom tank or exhaust tank of the reactor.

5. A method according to claim 1 wherein at least 20% of the cross-sectional area of the catalyst bed is free.

6. A method according to claim 1 wherein the working solution and hydrogen or hydrogen-containing gas are fed together to the top part of the reactor.

7. A method according to claim 1 or 6 wherein the working solution, which has been hydrogenated, or part thereof which is removed from the reactor is recirculated back into the reactor.

8. A method according to claim 7 wherein at least 20% of the cross-sectional area of the catalyst bed is free.

9. A method according to claim 7 wherein the input velocity of the working solution into the reactor is in the range from about 2 to about 10 m/s and the downwardly flow velocity of the working solution in the reactor is in the range from about 5 to about 50 cm/s, velocity here meaning superficial velocity.

10. A method according to claim 9 wherein at least 20% of the cross-sectional area of the catalyst bed is free.

11. A method according to claim 10 wherein the catalyst bed is constructed of elements restricted by a net structure and such that the catalyst is located inside the net structure.

12. A method according to claim 11 wherein the net comprises a metal net.

13. A method according to claim 11 wherein the net structure is designed to be removed and opened.

14. A method according to claim 11 wherein the input flow of hydrogen or hydrogen-containing gas is adjusted by means of the pressure or level height of the bottom tank or exhaust tank of the reactor.

15. A method according to claim 11 wherein in the catalyst bed restricted by the net structure is palladium bound to a carrier, the quantity of said catalyst being less than about 10% of the total weight of the palladium and the carrier.

16. A method according to claim 15 wherein the carrier is selected from a group consisting of activated carbon, aluminum oxide and silica gel.

17. A method according to claim 15 or 16 wherein the net structures correspond to a static mixer in shape.

18. A method according to claim 15 or 16 wherein the net structures are vertical, plate-like structures restricted by the net structures on both sides, the catalyst being placed in between the net structures.

19. A method according to claim 15 or 16 wherein the net structures are designed to be removed and opened.

20. A method according to claim 15 or 16 wherein the input flow of hydrogen or hydrogen-containing gas is adjusted by means of the pressure or level height of the bottom tank or exhaust tank of the reactor.

* * * * *